United States Patent
Abunojaim et al.

(10) Patent No.: US 10,878,136 B2
(45) Date of Patent: Dec. 29, 2020

(54) 3D MODEL VALIDATION AND OPTIMIZATION SYSTEM AND METHOD THEREOF

(71) Applicant: Mixed Dimensions Inc., San Francisco, CA (US)

(72) Inventors: Baha'Aldeen Abunojaim, Amman (JO); Muhannad Taslaq, Amman (JO); Hasan Aadab Alhimish, Amman (JO)

(73) Assignee: Mixed Dimensions Inc., San Francisco, CA (US)

( * ) Notice: Subject to any disclaimer, the term of this patent is extended or adjusted under 35 U.S.C. 154(b) by 337 days.

(21) Appl. No.: 15/703,866

(22) Filed: Sep. 13, 2017

(65) Prior Publication Data

US 2019/0332724 A1 Oct. 31, 2019

Related U.S. Application Data

(60) Provisional application No. 62/394,676, filed on Sep. 14, 2016.

(51) Int. Cl.
*G06F 30/00* (2020.01)
*B29C 70/04* (2006.01)
(Continued)

(52) U.S. Cl.
CPC ............ *G06F 30/00* (2020.01); *B29C 64/386* (2017.08); *B29C 70/04* (2013.01);
(Continued)

(58) Field of Classification Search
CPC .. G06F 17/50; G06F 2217/04; G06F 2217/08; G06F 2217/12; G06F 2217/41; G06F 2217/70; B29C 70/04; G06T 19/20
(Continued)

(56) References Cited

U.S. PATENT DOCUMENTS

| 5,411,259 A | 5/1995 | Pearson |
| 5,662,332 A | 9/1997 | Garfield |

(Continued)

FOREIGN PATENT DOCUMENTS

| EP | 1342490 A1 | 9/2003 |
| JP | 2001-087558 | 3/2001 |

(Continued)

OTHER PUBLICATIONS

International Search Report and the Written Opinion of the International Searching Authority dated Dec. 20, 2018, for related PCT Application No. PCT/US18/50942 filed Sep. 13, 2018, 13pages.

(Continued)

*Primary Examiner* — Justin C Mikowski
(74) *Attorney, Agent, or Firm* — Mahamedi IP Law LLP

(57) ABSTRACT

A 3D model system is configured to validate and optimize for 3D printing an unprocessed 3D model described by an input data file. The 3D model system is configured to detect printability issues associated with the unprocessed 3D model and automatically address these issues. Such issues can include boundary edges, non-manifold geometries, structural deficiencies, etc. Upon resolving these issues, the 3D model can be optimized for 3D printing. Optimizations can include hollowing to reduce printing cost and exterior surface smoothing. The resulting validated and optimized 3D model can be converted into an output data file which can be an input to a 3D printer or a 3D printing service for printing the object depicted by the 3D model. The 3D model system can operate as a network or cloud-based service. Users are able to interact with the 3D model system using a series of web-based user interfaces.

16 Claims, 8 Drawing Sheets

(51) Int. Cl.
G06T 19/20 (2011.01)
G06T 19/00 (2011.01)
B29C 64/386 (2017.01)
G06F 3/0481 (2013.01)
G06F 3/0484 (2013.01)
G06T 7/20 (2017.01)
G06F 111/02 (2020.01)
G06F 111/06 (2020.01)
G06F 113/22 (2020.01)
G06F 117/02 (2020.01)
G06F 117/08 (2020.01)
G06F 119/18 (2020.01)
G06T 17/20 (2006.01)

(52) U.S. Cl.
CPC ...... *G06F 3/04815* (2013.01); *G06F 3/04847* (2013.01); *G06T 17/20* (2013.01); *G06T 19/003* (2013.01); *G06T 19/006* (2013.01); *G06T 19/20* (2013.01); *G06F 2111/02* (2020.01); *G06F 2111/06* (2020.01); *G06F 2113/22* (2020.01); *G06F 2117/02* (2020.01); *G06F 2117/08* (2020.01); *G06F 2119/18* (2020.01)

(58) Field of Classification Search
USPC .............................................................. 703/1
See application file for complete search history.

(56) References Cited

U.S. PATENT DOCUMENTS

| | | | |
|---|---|---|---|
| 5,964,660 A | 10/1999 | James | |
| 6,196,920 B1 | 3/2001 | Spaur | |
| 6,200,216 B1 | 3/2001 | Peppel | |
| 6,306,035 B1 | 10/2001 | Kelly | |
| 6,443,843 B1 | 9/2002 | Walker | |
| 6,468,162 B1 | 10/2002 | Nakamura | |
| RE37,957 E | 1/2003 | Garfield | |
| 6,546,400 B1 | 4/2003 | Aberson | |
| 6,665,587 B2 | 12/2003 | Leone | |
| 6,922,816 B1 | 7/2005 | Amin | |
| 7,761,339 B2 | 7/2010 | Alivandi | |
| 7,862,428 B2 | 1/2011 | Borge | |
| 8,019,654 B2 | 9/2011 | Alivandi | |
| 8,314,790 B1 | 11/2012 | Zeiger | |
| 9,747,394 B2* | 8/2017 | Nelaturi | G06F 17/5009 |
| 9,922,456 B2 | 3/2018 | Forester | |
| 10,061,870 B2* | 8/2018 | Nelaturi | G06F 17/50 |
| 10,197,991 B2* | 2/2019 | Lee | G05B 19/41865 |
| 10,232,649 B2* | 3/2019 | Valade | B41J 13/0009 |
| 10,239,258 B2* | 3/2019 | Schmidt | B29C 64/40 |
| 10,307,971 B2* | 6/2019 | Sagawa | B33Y 30/00 |
| 10,338,566 B2* | 7/2019 | Lee | G05B 19/4099 |
| 10,409,932 B2* | 9/2019 | Tang | G06F 17/5018 |
| 10,409,933 B2* | 9/2019 | Komzisk | G06F 17/5018 |
| 2002/0082067 A1 | 6/2002 | Mckay | |
| 2002/0186238 A1 | 12/2002 | Sylor | |
| 2003/0037075 A1 | 2/2003 | Hannigan | |
| 2005/0182648 A1 | 8/2005 | Shaw | |
| 2005/0243085 A1 | 11/2005 | Schechter et al. | |
| 2006/0017721 A1 | 1/2006 | Couture-Gagnon | |
| 2011/0087350 A1 | 4/2011 | Fogel et al. | |
| 2015/0042663 A1 | 2/2015 | Mandel | |
| 2015/0066460 A1* | 3/2015 | Klinger | G06F 17/5018 703/2 |
| 2015/0089365 A1 | 3/2015 | Zhao et al. | |
| 2015/0151493 A1 | 6/2015 | Schmidt | |
| 2015/0269289 A1* | 9/2015 | Kim | G06F 17/5009 703/6 |
| 2015/0321427 A1 | 11/2015 | Gunnarsson et al. | |
| 2018/0024731 A1 | 1/2018 | Sanches | |
| 2019/0009472 A1* | 1/2019 | Mark | B29C 70/384 |
| 2019/0270251 A1* | 9/2019 | Nagai | B29C 64/386 |

FOREIGN PATENT DOCUMENTS

| | | |
|---|---|---|
| JP | 2001-184185 | 7/2001 |
| JP | 2002-325965 | 11/2002 |
| JP | 2002-360935 | 12/2002 |
| JP | 2003-169962 | 6/2003 |
| WO | WO 2016/118682 A1 | 7/2016 |

OTHER PUBLICATIONS

Calgary Herald; Bits & Bytes, Calgary, Alta.: Jun. 23, 1998. p. CO.02, 2 pages http://proquest.umi.com/pqdweb?did=196037931&sid=4&Fmt=3&clientId=19649&RQT=309&VName=PQD.

Paul Chapman, Calgary Herald. Calgary, Alta.: Nov. 13, 2004. p. E.4, 2 pages http://proquest.umi.com/pqdweb?did=739148501&sid=1&Fmt=3&clientId=19649&RQT=309&VName=PQD.

These Bodies are Free, so get one Now!: Advertising & Branding in Social Virtual Worlds, published Apr. 2004, based on a presentation given at the 2003 Interactive Media Forum: Identity & Cultures in Cyberspace, Miami University in Oxford, Ohio, Oct. 27, 2003 or online at www.virtualworldreview.com/papers/adbrand.pdf. 30 pages.

Janssen, Craig, Article to post on Rec.games.frp.announce. Found in web site: http://www.hoboes.com/pub/Role-Playing/Future/Traveller/Marc%20Miller%20Interview/. Jul. 1996. 3 pages.

"Visual Web Task", found in web site: www.lencom/VisualWTSite.html. 1 page.

Ren Reynolds; "Commodification of Identity in Online Communities"; Symposium conducted at the A(0),I.R conference: Internet Research 4.0 Broadening the Band, Oct. 16-19, 2003 Toronto, Canada. Available at http://renreynolds.tripod.com/downloads/RReynolds_AoIR_2003.doc. 26 pages.

A. Jolfaei, X. Wu. and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015.

Mufasu CAD, Published on May 9, 2014, https://www.youtube.com/watch?v=qCr-PihAUe8, 1 page.

CubifyFan "Cubify Software Tutorial", Jun. 5, 2012, https://www.youtube.com/watch?v=-zY0jQ1NiU ("Cubify"). 2 pages.

* cited by examiner

3D MODEL VALIDATION AND OPTIMIZATION SYSTEM AND METHOD THEREOF

CROSS-REFERENCE TO RELATED APPLICATIONS

This application claims benefit of priority to U.S. Provisional Patent Application No. 62/394,676, filed Sep. 14, 2016; the aforementioned application being incorporated by reference in its entirety.

BACKGROUND

Three-dimensional printing ("3D printing") refers to the computer-controlled process in which layers of material are deposited to create three-dimensional objects. A user can design and preview objects to be printed by a three-dimensional printer ("3D printer") using computer-aided design (CAD) software. 3D models generated by the CAD software are transmitted to 3D printers for printing the desired 3D object.

Existing processes to print 3D objects suffer from many drawbacks. For instance, 3D models designed by the user using CAD software can have a number of printability issues that introduce undesirable artifacts on the resulting 3D printed object or prevent the 3D models to be 3D printed altogether. Such printability issues are time consuming and tedious to resolve using existing 3D CAD software. Each printability issue can be hard to detect and can be even harder to remedy manually. In addition, 3D CAD software typically executes locally on the user's computing devices, is resource-intensive, and is not cross-platform compatible. As such, 3D CAD software may not be operable on existing hardware available to the user. Furthermore, a certain implementation of 3D CAD software may only be able to handle a limited set of input and/or output file formats or support only a limited set of 3D printers, further limiting the user. In addition, should the user want to 3D print content from a dynamic virtual environment such as a video game, the user typically has to go through a complex and tedious design process to recreate the content as 3D models. A solution is desired to address these shortcomings of existing processes and systems to print 3D objects.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
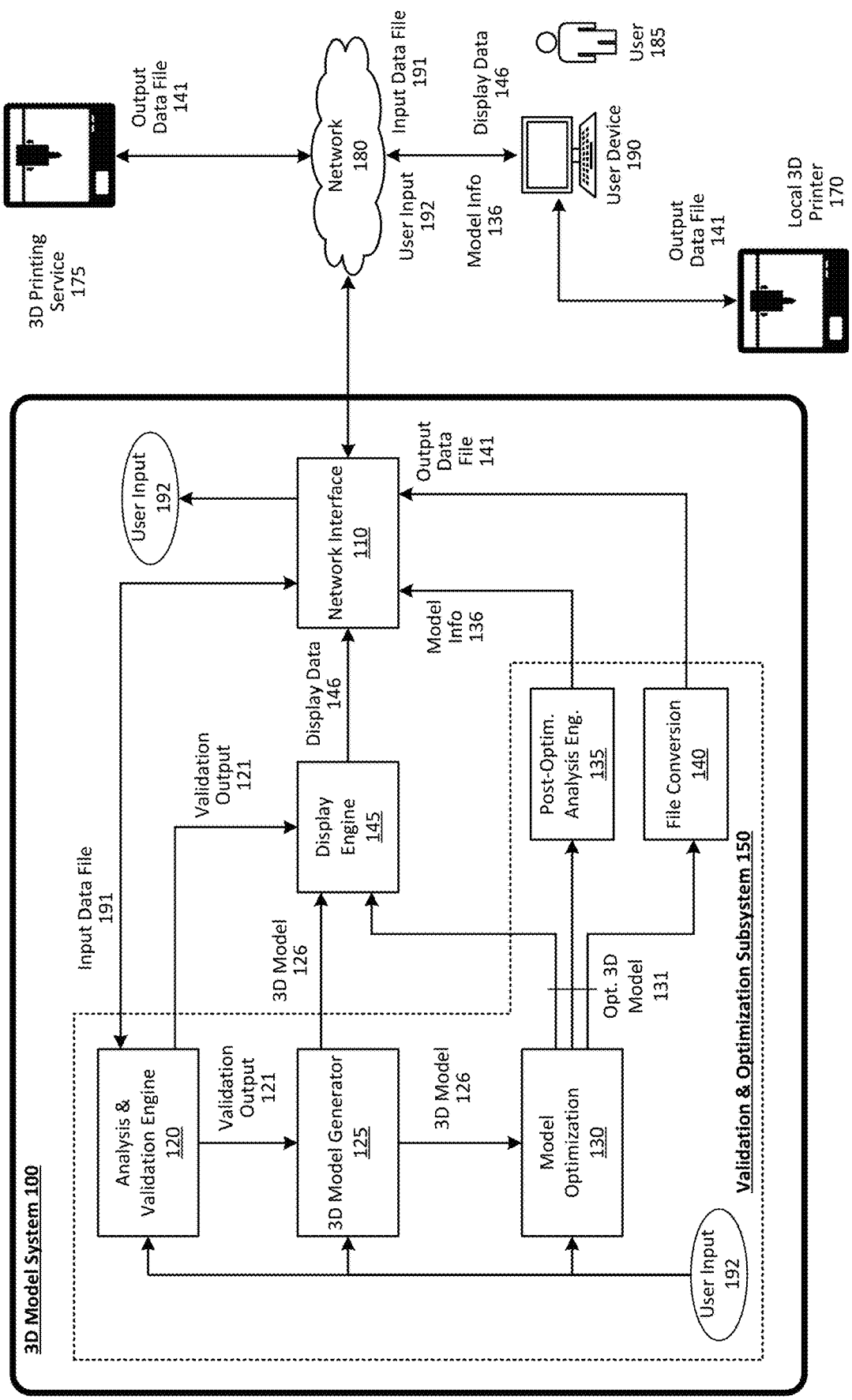
FIG. 1 is a block diagram illustrating an example 3D model system, in accordance with examples described herein.

Embodiments described herein relate to a 3D model system capable of validating, generating, and optimizing 3D models for 3D printing. Interacting with the 3D model system, a user can, in a user-friendly and streamlined fashion, cause printability issues relating to a 3D model to be detected and addressed. The 3D model system is further configured to optimize the 3D model for 3D printing to, for example, improve the look, feel, and/or usability of the resulting printed object, reduce printing costs, etc. In particular, various portions of the validation and optimization processes can be performed automatically by the 3D model system without user intervention or with minimal user input. After the 3D model is validated and optimized, output data can be generated in accordance with variety of file formats based on the user's needs and requirements. The output data can be transferred to a 3D printer of the user for 3D printing or can be transmitted to a 3D printing service to enable the 3D printing service to print the 3D model on behalf of the user. In addition, the user is able to interact with the 3D model system using a web browser-based user interface that clearly and informatively illustrates various aspects of the validation and optimization process. Furthermore, implementations of the 3D model system are configured to interact with a content capture plugin to enable the user to print 3D objects rendered in dynamically-rendered dynamic virtual environments such as a video game or a virtual reality environment.

According to embodiments, the validation and optimization performed by the 3D model system can be specifically tailored and customized based on, among other factors, the model of the 3D printer, desired printing material, scale/size of the object to be printed, and the orientation of the resulting object (e.g., orientation with respect to the build plate used during the 3D printing process). The 3D model system can receive an unprocessed 3D data file, analyze the 3D data file for errors, correct the detected errors and perform optimizations, render the 3D model and the associated corrections and optimizations for viewing by a user, and convert the validated and optimized 3D model to a file format selected by the user. The resulting processed 3D data file can be transmitted to a third-party 3D printing service for printing or can be downloaded by the user for printing on a local 3D printer operated by the user.

The 3D model system can be a networked computer system that operates as a cloud-based service to receive the unprocessed 3D data files (referred to herein as "input data files") over a network (e.g., the Internet) from the user. The input data files can be of any one of a plurality of supported file formats and types. The 3D model system, for example, can support at least data files having the following file extensions as input data files: .fbx, .obj, .dae, .stl, .3ds, .lwo, .lxo, .dxf, .x, .ifc, .ply, .cob, .ac, .ase, .dcom, .3mf, and .gcode. The input data files can represent unprocessed 3D models designed or captured by the user. These unprocessed models are generally un-validated and unoptimized for 3D printing. In some examples, the user can interact with the cloud-based service provided for by the 3D model system to upload input data files via a web browser interface. As an alternative, the user can also interact with third-party services (e.g., a file sharing service, a file storage service) to transmit the input data file to the 3D model system. In one particular example, the 3D model system can interface with a web-based sharing site for sharing digital designs to receive data input files corresponding to user-designed or user-captured 3D objects.

According to embodiments, the 3D model system can extract relevant data from the input data file and analyze the extracted data to detect printability issues of the unprocessed model. Printability issues can include issues caused by intersecting geometries, structural deficiencies (e.g., insufficient structure support, inadequate wall thickness, etc.), and other printer-specific issues (e.g., specific constraints of a 3D printer and/or printing materials). In certain implementations, the 3D model system can automatically correct these issues by re-building the model to generate a validated 3D model. The 3D model system can perform such a process without user intervention or with minimal user input.

According to some examples, the 3D model system is configured to generate a validated model after correcting for errors and printability issues in the initial model. The validated model can be generated in one of a plurality of processes. In a first model generation process, the validated model is generated on a layer-by-layer basis. In a second model generation process, the validated model is generated using voxels, which are an array of elements of volume that represent three-dimensional space in a computer-based model.

In an example, in the first model generation process, the 3D model system creates a plurality of horizontal layers (e.g., relative to the build plate, based on the orientation of the 3D model, etc.) that comprise the 3D model. The 3D model system can process each layer and thicken any portions of the layer that fail to meet the criterion for minimum layer thickness. The layers are merged into a single geometry and any empty interior spaces (e.g., bubbles) within the merged geometry are removed (e.g., filled so as not to be empty spaces). In addition, triangulation between adjacent layers are performed such that a smooth surface between the layers is obtained. Furthermore, within each layer, any intersecting geometries are identified and removed (e.g., merged together to remove the intersections).

In certain implementations, in the second model generation process, a 3D array of voxels representing the 3D model is first created. Each of the voxels represent a finite volume of space. For each group of adjacent voxels, a determination is made as to whether the dimension of the group falls below the minimum thickness threshold imposed by the 3D printer requirements or by the printing material. If the dimension of any group of adjacent voxels is determined to be below the threshold, additional voxels are added such that the thickness threshold limit is met. In addition, a smooth operation is performed to smooth the exterior surface of the generated 3D model. To perform the smoothing operation, an exterior outer shell of voxels (i.e. those forming the outer surface) is first identified and labeled using, for example, the finite element method. For each labeled exterior voxel, an exterior surface orientation is determined. For a particular exterior voxel, this can be accomplished by looking up a stored table of valid exterior surface orientations, the lookup being performed based on the orientation of the particular voxel as well as the orientations of the particular voxel's adjacent neighbor exterior voxels. Using the determined surface orientation of the particular voxel, a triangulation operation can be performed to smooth the exterior surface of the particular voxel.

In the examples described herein, the 3D model system can further optimize a 3D model. Such optimizations can include polygon count reduction in which the user can control the polygon count used in the 3D model. A high polygon count can increase the details on the surface of the 3D model but can also lead to undesirable effects such as long and resource-intensive processing, large output data file size, and potential hardware and software failures in the 3D printing process. Accordingly, the 3D model system provides an automated process to increase or decrease polygon counts. This automated process can be controlled by the user via a user input (e.g., a slider bar). The polygon count reduction can be performed before or after the validated 3D model is generated.

In addition, the 3D model system can perform hollowing of the 3D model to reduce costs associated with the 3D printing process. 3D printing materials can be expensive and thus by hollowing the 3D model, the 3D model system can drastically reduce the cost to print an object. The hollowing process can be performed by first identifying appropriate locations to place escape holes for the printing material. The 3D model system can examine the orientation of the 3D model and find a location on a downward-facing surface of the 3D model having a sufficient size to hold an escape hole. The 3D model system can be configured to do so because downward-facing surfaces of the printed object are less noticeable and thus affects the aesthetics of the printed object to a lesser degree. In addition, the 3D model system can generate an additional surface—an inner surface—within the portion of the 3D model to be hollowed. Using a Boolean operation, the 3D model system can identify regions that are further inward of the portion of the 3D model to be hollowed than the inner surface and remove these portions from the 3D model. This hollowing process can be controlled via a user input. For example, the 3D model system can receive a user input corresponding to an amount of hollowing to be performed. The user input can adjust the location of the inner surface within the portion of the 3D model to be hollowed. By adjusting the inner surface closer to the outer surface, more of the portion of the 3D model is hollowed. On the other hand, by adjusting the inner surface to be further away from the outer surface, less of the portion of the 3D model is hollowed.

Additional optimization processes include texture preservation to maintain colors on the outer surface of the 3D model. In other instances, the input data file may not contain any representations of surface colors. In these cases, the user can be presented with a user interface to color various portions of the 3D model manually or import a pre-designed color map to be applied to the outer surface of the 3D model. In addition, the 3D model system can allow the user to select regions of the 3D model to render into moveable joints. This process can be suitable for 3D printing figures or objects having movable parts.

After the validation and optimization processes, the 3D model system can convert the resulting validated and optimized 3D model into an output data file. A plurality of output data file formats are supported, including at least the following file formats: .gcode, .stl, svg, .3mf, and .obj. In certain examples, the output data file can be downloaded over a network by the user device for printing by the user using a 3D printer coupled to the user device. In other examples, the output data file can be transmitted over the network to a 3D printing service. The 3D printing service can print the validated and optimized 3D model and deliver the printed object to the user.

Among other benefits, the 3D model system provides an automated process and solution for validating and optimizing 3D models for the user without the need to utilize expensive and complicated 3D CAD software. Instead of purchasing and learning to use expensive and complicated 3D CAD software, the user is able to utilize web-based user interface to view various aspects of the validation and optimization process performed by the 3D model system supported by ubiquitous web browsers. In addition, the validation and optimization processes of the 3D model system are performed automatically without user intervention or with minimal user input. By streamlining the validation and optimization processes and reducing the amount of user input necessary to validate and optimize the 3D models, the 3D model system enables the 3D printing process to be performed in a cheaper and faster fashion. Furthermore, the 3D model system supports a variety of input file types and formats and can also convert generated output data to a variety of widely-supported file types and formats. In this manner, the 3D model system can work with a wide range of 3D model data files as well as a wide range of 3D printer models and 3D printing services.

In addition, by implementing the validation and optimization process as a network service performed by a networked 3D model system, embodiments described herein enable these resource-intensive process to be performed by specialized hardware that are often out of reach of the ordinary user. For instance, many of the functions of the validation and optimization process require intensive use of specialized hardware and software resources (e.g., powerful CPUs and/or GPUs, large capacity hard drives to store intermediary data, etc.). By offloading these functionalities on servers that function as the networked 3D model system, the hardware and software requirements on the user computing device is reduced.

Furthermore, in many implementations, the user can cause the 3D model system to transmit the output data file to a 3D printing service for 3D printing. In this manner, network transmission requirements on the user's computing device is reduced—the user computing device is no longer required to handle extremely large output data files representing the validated and optimized 3D models generated by the 3D model system.

Embodiments described herein further provide for user interactions with the 3D model system using a set of user interfaces displayed on a user device operated by the user (e.g., desktop computer, laptop computer, tablet, smartphone, etc.). The user device communicates with the 3D model system to receive display data to enable a web browser or a specialized application executing on the user device to display information transmitted by the 3D model system. In addition, the user interface can receive user input to relay to the 3D model system. The set of user interfaces allows the user to view and provide input on various aspects of the validation and optimization process. Using the set of user interfaces, the user can be guided through the process to fix and optimize the unprocessed 3D model for 3D printing.

In one aspect, the set of user interfaces includes a first user interface to view the unprocessed 3D model along with any detected printability issues detected by the 3D model system. Within this user interface, the unprocessed 3D model is rendered and displayed after the validation process. The user is able to manipulate (e.g., move, rotate, and scale) the displayed model using keyboard and/or soft selection inputs. Information regarding the unprocessed 3D model can be displayed in an information panel. Information such as the dimensions of the unprocessed 3D model (e.g., maximum/minimum width, maximum/minimum height, and maximum/minimum depth), three-dimensional mesh information (e.g., triangle count, polygon count, vertex count, volume), and the like can be displayed within the information panel. In addition, information regarding any detected printability issues are displayed. For example, the user interface can display the number of non-manifold geometry and boundary edges detected in the unprocessed 3D model. Furthermore, the first user interface can display a notification regarding the existence of printability issues should any be detected by the 3D model system. Still further, the unprocessed 3D model can be displayed within the first user interface feature in a manner that highlights the detected printability issues. For instance, portions of the unprocessed 3D model having detected printability issues can be displayed in colors that are different from portions of the unprocessed 3D model without printability issues. In some examples, the printability issues displayed in a color-coding scheme based on the seriousness of the issues. For instance, certain printability issues that can cause undesirable artifacts in the resulting printed object but do not prevent the 3D model to be printed can be displayed in a first color (e.g., yellow). Other more serious printability issues that can prevent the 3D model (or a portion thereof) from being printed can be displayed in a second color (e.g., red). Furthermore, portions of the 3D model having no detected printability issues can be displayed in a third color (e.g., green). In one implementation, portions of the unprocessed 3D model that are detected by the 3D model system to correspond to non-manifold geometries are displayed in yellow, detected boundary edges are displayed in red, and portions of the 3D model that meet all validity criteria analyzed by the 3D model system are displayed in green.

In certain implementations, the set of user interfaces include a second user interface for displaying the validated and optimized 3D model. Similar to the first user interface for displaying the unprocessed 3D model, the user can interact with the second user interface to manipulate the validated and optimized 3D model. Information regarding the validated and optimized 3D model can be provided within the second user interface. In addition, a notification can be displayed that informs the user whether the validated and optimized 3D model is free of printability issues and thus ready for 3D printing. The validated and optimized 3D model can be displayed in green to indicate that that the validated and optimized 3D model is free of printability issues. In some of the examples, the unprocessed 3D model can be displayed side-by-side with the validated and optimized 3D model so that the user can visually compare to the two.

According to embodiments, the user can further utilize the set of user interfaces to input parameters to customize the validation and/or customization processes performed by the 3D model system. For instance, the user can enter, via a slider selection on a user interface for example, a minimum wall thickness to be applied during the validation process of the 3D model. Based on the user input, the 3D model system can thicken any portions of the 3D model that do not meet the inputted minimum wall thickness. In addition, the user can interact with a user interface feature displayed on the user device that enables the user to control the hollowing process. For instance, the user interface feature can be a hollowing slider that controls the extent of hollowing the 3D model system performs on the 3D model during the optimization process. The user can input a selection to maximize or minimize the amount of hollowing to suit his or her particular needs.

One or more of the user interfaces can also display final information regarding the optimized 3D model as well as the 3D printing process. For instance, information regarding an estimated cost of printing the 3D model can be displayed. The cost estimate can be computed using a volumetric analysis of the optimized 3D model, after taking into account any hollowing that had been performed by the 3D model system. The 3D model system can query the current market value of printing materials per unit volume and multiply the market value by the result from the volumetric analysis to obtain the cost estimate. In addition, effects on the printing process or on the final printed object as a result of the optimization can be displayed. For instance, a user interface can display a cost savings amount achieved by the hollowing process. The user can then adjust the hollowing process (e.g., using the aforementioned hollowing slider) to achieve the desired cost savings. The 3D model system can further compute a printability score or printability metric of the optimized 3D model. The printability score can range from, for example, 1 to 10 and denote how easily the optimized 3D model can be printed by a 3D printer or a 3D printing service. For instance, unresolved issues such as non-manifold geometries in the optimized 3D model decrease the printability score.

Embodiments described herein further provide for an example 3D model system, in conjunction with a content capture plugin, to print 3D content rendered in dynamically-generated virtual environments such as video games, virtual reality environments, augmented reality environments, and the like. The virtual content can be generated by a content server (e.g., a server for facilitating an online video game) or by a user device (e.g., computer, tablet, or smartphone of the user). Capture 3D content, its orientation and pose, and any surrounding environment rendered in the virtual environment can be captured for 3D printing by a content capture plugin executing on the content server or on the user device. As used herein, captured 3D content can refer to any dynamically-rendered content captured for 3D printing, including a virtual avatar of the user (e.g., a character depicted in a video game or in a VR environment, an object depicted in the virtual environment). The 3D model system can receive data from the content capture plugin to generate a preliminary 3D model and validate, generate, and optimize the 3D model for 3D printing by the user or by a 3D printing service.

In certain implementations, the 3D model system can pre-store data corresponding to non-dynamic aspects of the 3D content to be captured. Such data, referred to herein as "asset data," can include data indicating aspects of the 3D content that indicate default characteristics such as a default shape, contour, structure, texture, color, and the like. In these implementations, the content capture plugin can capture, from the dynamically-rendered virtual environment, data indicating dynamic aspects of the 3D content to be captured, referred to herein as "configuration data." Configuration data can indicate changes to the default characteristics of the 3D content caused by the dynamic rendering of the 3D content within the virtual environment. For example, the configuration data can indicate a dynamic posture and orientation of a virtual avatar or virtual objects carried by the virtual avatar in the virtual environment. The configuration data can further indicate other dynamically-generated aspects of the 3D content such as dynamically-generated objects nearby to or surrounding the captured 3D content as rendered in the virtual environment. The configuration data can be captured by the content capture plugin and transmitted to the 3D model system. Using the asset data and configuration data, the 3D model system can construct a preliminary 3D model of the 3D content as the 3D content was rendered within the dynamically-generated virtual environment. In this manner, by only pre-storing the asset data and only capturing and transmitting the configuration data, the 3D model system and the content capture plugin can efficiently utilize network transmission capacity of the 3D model system and the content capture plugin. In addition, because the content capture plugin only needs to capture dynamically-generated aspects of the 3D content (e.g., posture, orientation, surrounding objects in the environment, etc.), processing resources on systems executing the content capture plugins (e.g., user device or content server) can be much more efficiently utilized.

According to embodiments, the user can cause 3D content to be captured by the content capture plugin executing on the content server or on the user's computing device. The user can do so via a selection on the user interface embedded into the display of the virtual environment or by setting a predefined condition. For instance, the content capture plugin executing on the user device or on the content server can cause a user interface feature (e.g., a capture content soft selection button) to overlay the displayed virtual environment. Upon the user selection of the user interface feature, dynamically aspects of the 3D content (e.g., position, posture, orientation, pose, etc.) can be captured by the content capture plugin for transmission to the 3D model system. In addition or as an alternative, a keyboard key combination (e.g., a "hotkey") can be created for capturing the 3D content for 3D printing. The user can also set a predefined condition, the satisfaction of which triggers the capture of dynamic aspects of the 3D content. The predefined condition can include reaching a certain milestone within the virtual content, defeating a particular adversary in a video game, etc. Once the predefined condition is triggered, the content capture plugin captures the virtual avatar and its orientation and posture for transmission to the 3D model system.

Such a combination of 3D model system and content capture plugin has many advantages over existing means of printing 3D objects rendered in a dynamically-generated virtual environment. For instance, the networked architecture of the 3D model system and content capture plugin ensures that the rendering of the dynamic virtual environment is not deprived of necessary hardware and software resources by the generation, validation, and optimization of the 3D model using the captured content data. Because the generation, validation, and optimization of the 3D model based on captured content data is performed by the 3D model system while the dynamic virtual environment is rendered by the user device and/or the content server, separate hardware and software resources are utilized to perform these two resource-intensive tasks. Furthermore, using the content capture plugin and the 3D model system, the user can expediently and effortlessly capture content rendered in virtual environments for 3D printing.

According some implementations, the 3D model system can store the output data file—corresponding to the validated and optimized 3D model—on a network-based cloud storage device managed by the 3D model system. In certain examples, a user can allow the output data file to be viewed, shared, or printed by other users. This aspect of the 3D model system to allow users to share 3D models that are ready for printing amongst each other. Furthermore, the 3D model system can interact with application programming interfaces (APIs) to allow developers and content creators direct access to functionalities provided by the 3D model system in validating and optimizing 3D models.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. The computing device can also operate a designated application configured to communicate with the network service.

One or more examples described herein provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example 3D model system, in accordance with examples described herein. The example 3D model system 100 provides a one-stop solution to enable a user 185 to validate and optimize for 3D printing an unprocessed 3D model described by an input data file 191. In particular, the 3D model system 100 can detect and automatically resolve printability issues in the unprocessed 3D model such as non-manifold geometries, boundary edges, intersecting geometries, insufficient wall thickness, etc. The 3D model system 100 is configured to generate an output data file 141 describing a validated and optimized 3D model that is ready for 3D printing.

The input data file 191 can be received by the 3D model system 100 over a network 180 from a user device 190 operated by the user 185. As an alternative, the input data file 191 can be received over the network 180 via a third-party file sharing or hosting service. The user 185 can, via a web-based user interface provided by the 3D model system, upload the input data file 191 from the user device or from a third-party file sharing or hosting service. The input data file 191 can describe an unprocessed 3D model that depicts an object to be 3D printed. The input data file 191 can be of one of a plurality of supported file formats, including: .fbx, .obj, .dae, .stl, .3ds, .lwo, .lxo, .dxf, .x, .ifc, .ply, .cob, .ac, .ase, .dcom, .3mf, and .gcode. The input data file 191 can be received by a network interface 110 of the 3D model system 100.

According to embodiments, the 3D model system 100 can include an analysis and validation engine 120 to perform analysis on the unprocessed 3D model described by the received input data file 191. The analysis and validation engine 120 can detect non-manifold geometries, boundary edges, intersecting geometries, insufficient wall thickness, insufficient structural support, etc. The analysis and validation engine can output a validation output 121 to a display engine 145 to enable the display engine to generate display data 146 corresponding to the unprocessed 3D model as well as associated printability issues. For instance, the display engine 145 can generate display data 146 that, when transmitted to the user device 190, causes a browser-based user interface displayed on the user device 190 to render and display the unprocessed 3D model described by the input data file 191. By interacting with the user interface, the user 185 is able to view and manipulate the unprocessed 3D model. For instance, the user 185 can, via keyboard inputs and/or inputs using a soft selection on the user interface, rotate the displayed unprocessed 3D model. The user 185 may also move the rendered unprocessed 3D model 122 within the user interface or apply a scaling factor to increase or decrease the size of the unprocessed 3D model 122. The user 185 is also able to view detected printability issues associated with the unprocessed 3D model. Furthermore, information regarding the unprocessed 3D model can also be viewed by the user on the user interface displayed on the user device 190.

The analysis and validation engine 120 can receive user input 192 via the network interface 110 to indicate, for example, parameters such as desired 3D printer model or desired 3D printing service and the printing material. In addition, the user can manually input parameters such as minimum layer/wall thickness. In response to user input 192 indicate such parameters, the analysis and validation engine 120 can re-perform portions of the analysis to enable the user to view updated validation results.

The 3D model system 100 can include a 3D model generator 125 to generate a validated 3D model 126 based on the unprocessed 3D model 122 and the detected printability issues. Here, the 3D model generation can be performed based on the hardware of the 3D model system 100. For instance, in a 3D model system 100 having specialized hardware such as graphics processing units (GPUs), a voxel-based 3D model can be generated. In other implementations of the 3D model system 100, a layer-based 3D model can be generated. The generated 3D model 126 can be transmitted to the display engine 145. In response, the display engine 145 can generate display data 146 corresponding to the 3D model 126. The display data 146 can cause the user interface of the user device 190 to render and display the generated 3D model.

In various implementations, the 3D model system 100 further includes a model optimization 130 to perform optimizations on the generated 3D model. Optimizations can include hollowing to reduce needed printing materials (and thus cost of printing), exterior surface smoothing, polygon reduction, texture preservation/coloring of the exterior surface, and moveable joint creation. The model optimization 130 generates an optimized 3D model 131 that incorporates the optimizations performed. The optimization process performed by the model optimization 130 can be performed based on user input 192. As one example, the user is able to select a hollowing setting (e.g., via a hollowing slider bar, entering a hollowing coefficient, etc.) that dictates the amount of material to be hollowed during the 3D printing process. In addition, the user input 192 can further specify a desired polygon count which can dictate the polygon reduction process. For instance, a user input 192 corresponding to a desired setting of a high polygon count can cause the polygon reduction process to reduce fewer polygons from the 3D model.

The 3D model system 100 can further include a post-optimization analysis engine 135. The post-optimization analysis engine 135 can perform another round of analysis and validation on the optimized 3D model 131 to ensure no printability issues are introduced in the optimization process performed by model optimization 130. Should any printability issues be detected, the 3D model system 100 is configured to re-validate the optimized 3D model 131 by addressing the specific issues detected. In some examples, optimization that led to the introduction of printability issues are identified and rolled back. The post-optimization analysis engine 135 can further analyze the optimized 3D model to provide useful information (e.g., model info 136) to the user 185. For example, a volumetric analysis can be performed to determine the dimensions and volume of the optimized model 131. In addition, based on the desired printing material (or the desired 3D printing service) and the determined volume of the optimized model 131, the post-optimization analysis engine 135 can determine a cost estimate corresponding to the approximate cost to 3D print the optimized 3D model 131. In addition, the post-optimization analysis engine 135 can generate information regarding the benefits of the validation and/or optimization process performed by the 3D model system 100. For instance, any cost savings associated with the hollowing process can be summarized for display for the user 185. The post-optimization analysis engine 135 can further compute a printability score or printability metric of the optimized 3D model 131. The printability score can range from, for example, 1 to 10 and denote how easily the optimized 3D model can be printed by a 3D printer or a 3D printing service. For instance, unresolved issues such as non-manifold geometries in the optimized 3D model decrease the printability score.

The 3D model system 100 can also include a file conversion 140 to convert the optimized 3D model into a desired format for the output data file 141. Because various 3D printer models, CAD software, and 3D printing services support different file formats, the file conversion 140 is needed to ensure compatibility of the 3D model system 100 with a variety of 3D printer models and 3D printing services. A plurality of output data file formats are supported for the output data file 141, including at least the following file formats: .gcode, .stl, svg, .3mf, and .obj.

The output data file 141 can be transmitted over the network 180 to the user device 190 (e.g., computer, tablet, etc.) to enable the user 185 to 3D print the desired object using a local 3D printer 170 coupled to the user device 190. As an alternative, the output data file 141 can be transmitted to a 3D printing service 175 that can 3D print the desired object on behalf of the user 185. The 3D printing service can deliver the printed object to the user.

Figure 2:
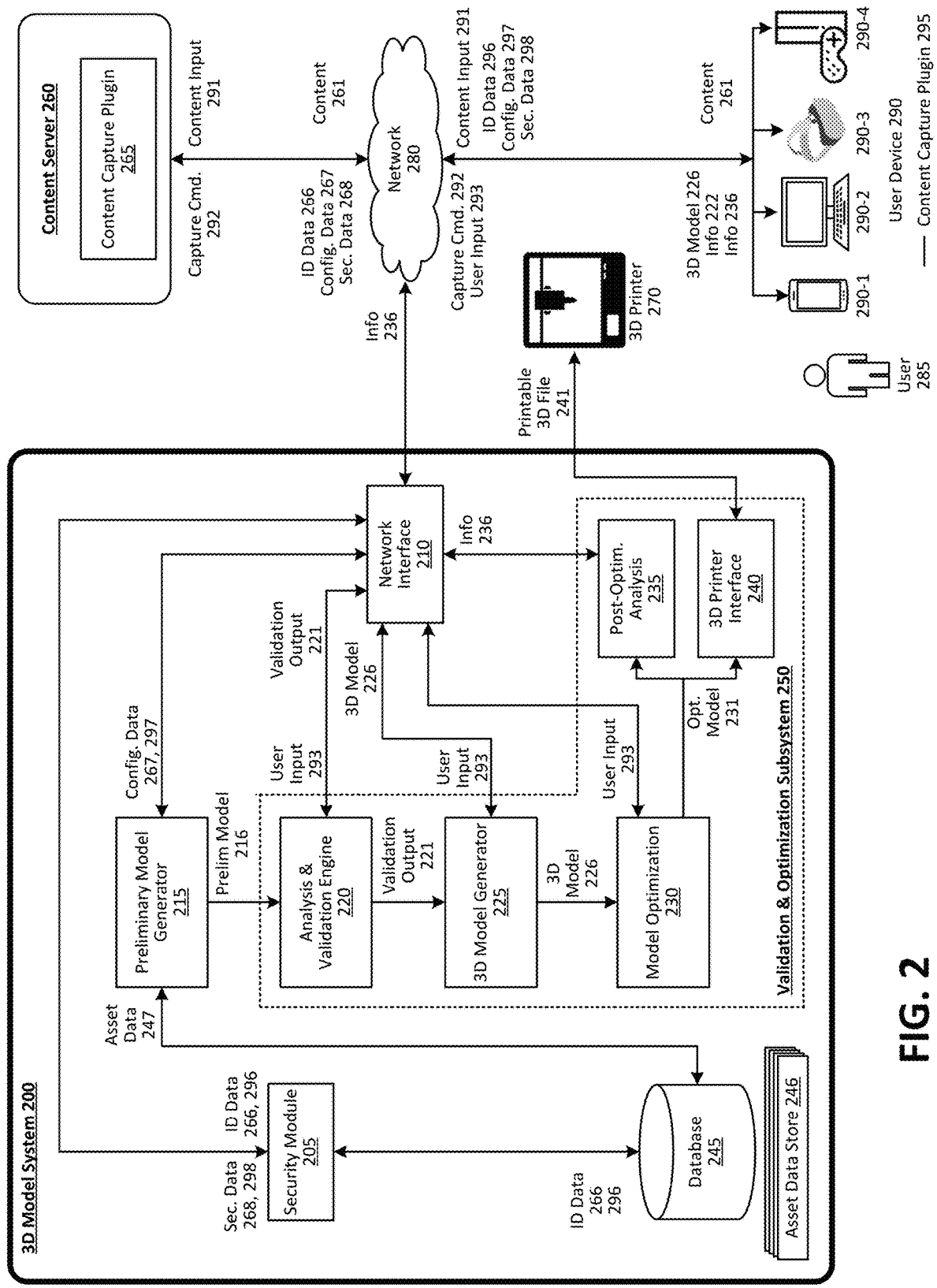
FIG. 2 is a block diagram illustrating another example 3D model system in communication with a content server and user device(s), in accordance with examples described herein.

FIG. 2 is a block diagram illustrating another example 3D model system in communication with a content server and/or user device(s), in accordance with examples described herein. The 3D model system 200 depicted in FIG. 2 is configurable to generate, validate, and optimize 3D models for 3D printing based on 3D content rendered in a dynamic virtual environment such as an interactive video game, a virtual reality environment, an augmented reality environment, and the like. The dynamic virtual environment can be rendered by a content server 260 or by a user device 290. As illustrated in FIG. 2, the user device 290 can be a mobile device 290-1 (e.g., smartphone, tablet computer, smartwatch, etc.), a personal computing device 290-2 (e.g., desktop computer, laptop computer, etc.), a virtual reality environment viewer 290-3 (e.g., VR headset, etc.), a gaming console 290-4, and the like. The 3D content can be a virtual avatar or an object rendered in the dynamic virtual environment. The 3D content can be captured by a content capture plugin 265 executing on the content server or a content capture plugin 295 executing on the user device 290. Using the 3D model system 200 and the content capture plugin(s) 265 and/or 295, a user 285 can dynamically capture 3D content (e.g., a virtual avatar) rendered in a dynamic virtual environment for 3D printing without pausing or affecting the rendering or progress of the dynamic virtual environment.

In certain examples, the dynamic virtual environment can be provisioned by the content server 260. Such examples can include an online multi-player video game, a network-based virtual reality environment, etc. In such examples, the content server 260 generates content 261 which can correspond to an online video game, an online virtual reality environment, an online augment reality environment, etc. The content 261 is transmitted to the user device 290 via network 280 for display on the user device 290. The user 285 can interact with or manipulate the displayed content 261 to cause the user device 290 to generate content input 291. The content input 291 can be transmitted from the user device 290 to the content server 260 and can, for example, control a virtual avatar (e.g., game character, virtual reality character, etc.) within the virtual convent environment. For instance, the user 285 can use an input/output (I/O) device (e.g., keyboard, mouse, controller, touchscreen, V/R headset, etc.) coupled to the user device 290 to generate the content input 291. Also in these examples, content capture plugin 295 can execute on the content server 260 to capture data for transmission to the 3D model system 200 such that a 3D model can be generated for the captured 3D content rendered in the dynamic virtual environment. The captured 3D content can correspond to a virtual avatar controlled or manipulated by the user 285.

In other examples, the dynamic virtual environment can be generated by the user device 290 for display on the user device 290. Examples can include a locally-rendered video game, a virtual reality environment or augmented reality environment generated by the user device 290, and the like. The dynamic virtual environment in certain online environments (e.g., online multiplayer video games, online-based virtual reality environments) can also be generated by the user device 290. In such examples, one or more servers can be used to coordinate the dynamic virtual environments displayed on the user devices 290 of each of the users; the content displayed on the user devices 290, though, are rendered and generated by the user devices 290. In these examples, the user 285 can also interact with or manipulate the dynamic virtual environment. Similar to the examples described above, the user 285 can provide input via an I/O device coupled to the user device 290 to interact with or manipulate the dynamic virtual environment. In these examples, content capture plugin 295 execute on the user device 290 to capture information for transmission to the 3D model system 200 such that a 3D model can be generated for 3D content rendered within the dynamic virtual environment.

In certain implementations, during the rendering of a dynamic virtual environment on the user device 290, the user 285 can cause the content capture plugin 265 or content capture plugin 295 to capture the 3D content via a user input. For example, the dynamic virtual environment displayed on the user device 290 can include a capture user interface feature to initiate capturing of the 3D content. The capture user interface feature can be overlayed on the displayed dynamic virtual environment. As another example, the user 285 can input a keyboard combination (e.g., a hotkey) to generate the user input to cause the content capture plugins 265 and 295 to capture the 3D content. For content capture plugin 265, the activation of the user input can cause a capture command 292 to be transmitted to the content server 260. In certain implementations, one or more predetermined conditions can be set to automatically trigger the capturing of the 3D content. The predetermined conditions can be tied to an accomplishment within the dynamic virtual environment (e.g., achieving a game level, reaching a milestone, etc.) or a virtual location within the dynamic virtual environment. Thus, upon achieving the accomplishment or reaching the virtual location, the user device 290 can be configured to automatically generate a signal or command to cause the content capture plugins 265 or 295 to capture the 3D content for generation of a 3D model.

According to embodiments, 3D content rendered as a part of the dynamic virtual environment can be captured and 3D printed by the 3D model system 200 and the content capture plugins 265 and 295. In certain implementations, the 3D model system 200 can pre-store asset data (e.g., asset data 247) necessary to generate 3D models corresponding to certain specified 3D content (e.g., specific virtual avatars, specific in-game characters, specific objects, etc.) in the dynamic virtual environment rendered by the content server 260 and/or the user device 290. The asset data can indicate non-dynamic or default characteristics of the 3D content. For example, the asset data can indicate a default shape, contours, color, texture, etc. of the 3D content. The content capture plugins 265 and 295 can capture configuration data (e.g., configuration data 267, configuration data 297, etc.) of the 3D content as it is dynamically rendered within the dynamic virtual environment. The configuration data can indicate characteristics of the 3D content that are dynamically-generated as the 3D content is rendered within the dynamic virtual environment at a particular moment in time (e.g., time of capture). For instance, the configuration data can indicate a dynamic posture (e.g., a change relative to a default posture) of a virtual avatar at the particular moment in time. Using the asset data and the configuration data, the 3D model system 200 can generate a preliminary 3D model that replicates the 3D content as it was rendered at the particular moment in time. In some examples, the configuration data can indicate other dynamically-generated content such as virtual objects held by or near the virtual avatar in the dynamic virtual environment.

In response to a user input (e.g., capture command 292) or an automatically generated signal, the content server 260 or user device 290 can generate ID data 266 or 296, respectively, and configuration data 267 or 296, respectively. The configuration data 267 or 297 can be configuration data of the 3D content captured at the particular time the user input or the automatically generated signal is received. Thus, configuration data 267 or 297 can indicate a dynamic characteristic of the 3D content (e.g., a pose, a posture, an orientation) rendered at particular time in the dynamic virtual environment. ID data 266 or 296 can correspond to an identity of the 3D content. The ID data 266 or 296 can indicate which of a plurality of sets of pre-stored asset data corresponds to the 3D content that is captured. For example, asset data corresponding to a plurality of virtual avatars in a video game can be stored in a database 245 as part of an asset data store 246. The ID data 266 or 296 can indicate which of the virtual avatars is intended to be captured by the user 285 such that the appropriate asset data 247 can be retrieved based on the ID data 266 or 296 from the database 245 storing the asset data store 246. In a video game example, the ID data 266 or 296 can, by default, indicate that the virtual avatar controlled by the user 285 in the dynamic virtual environment as the 3D content to be captured. In some implementations, the user 285 can be prompted to select an object to capture within the dynamic virtual environment.

According to embodiments, the content server 260 or user device 290 can further generate security data 268 or 298, respectively. The security data 268 or 298 can be used to authenticate the transmission of data between the 3D model system 200 and the content server 260 or user device 290. An authentication token may be included in the security data 268 or 298. The security data 268 or 298 can be received and processed by a security module 205 to ensure that the database 245 and the asset data store 246 are not exposed to unauthorized access.

The 3D model system 200 can include a preliminary model generator 215 to generate preliminary 3D model 216 based on the received asset data 247 and configuration data 267 or 297. The generated preliminary 3D model 216 replicates the 3D content as it was rendered in the dynamic virtual environment at the time 3D content was captured by the content capture plugins 265 or 295. In one implementation, the preliminary model generator 215 can generate, for example, a 3D model corresponding to a virtual avatar in a default pose and orientation based on the asset data 247. The preliminary model generator 215 can apply the configuration data 267 or 297 to the 3D model to configure the 3D model into a pose, orientation, or position that is indicated by the configuration data 267 or 297 to arrive at the preliminary 3D model 216.

The 3D model system 200 can further include a validation and optimization subsystem 250 that validates and optimizes the preliminary 3D model for 3D printing by a 3D printer 270. The validation and optimization subsystem 250 can include similar components and perform similar functions as the validation and optimization subsystem 150 described with respect to FIG. 1. For instance, the validation and optimization subsystem 250 can include an analysis and validation engine 220 to generate validation output 221 based on the preliminary 3D model 216, a 3D model generator 225 to generate a validated 3D model 226 based on the validation output 221, and a model optimization 230 to generate an optimized 3D model 231 based on the validated 3D model 226. In addition, the validation and optimization subsystem 250 can include post-optimization analysis 235 to perform analyze the optimized model 231. The post-optimization analysis 235 can generate information 236 regarding the optimized 3D model 236, such as a cost to print, a number of detected printability issues, etc. The information 236 can be transmitted over the network 280 to the user device 290 for viewing by the user 285.

The validation and optimization subsystem 250 can further include a 3D printer interface 240 for converting the optimized 3D model 231 into a format (e.g., printable 3D file 241) that can be received by the 3D printer 270. The 3D printer 270 can be a 3D printer operated by a 3D printing service or a 3D printer of the user 285. The 3D printer 270 can 3D print the 3D model represented by the printable 3D file 241 which replicates the 3D content rendered in the dynamic virtual environment.

According to certain embodiments, the 3D model system 200 can enable the optimized 3D model 231 and/or the printable 3D file 241 to be shared with other users of the 3D model system 200. For instance, based on permission by user 285 who captured the 3D content associated with the 3D model, the optimized 3D model 231 and/or the printable 3D file 241 can be viewed, downloaded, or edited by other users of the 3D model system 200. The 3D model system 200 can provide a user interface for sharing the generated 3D models.

Methodology

Figure 3:
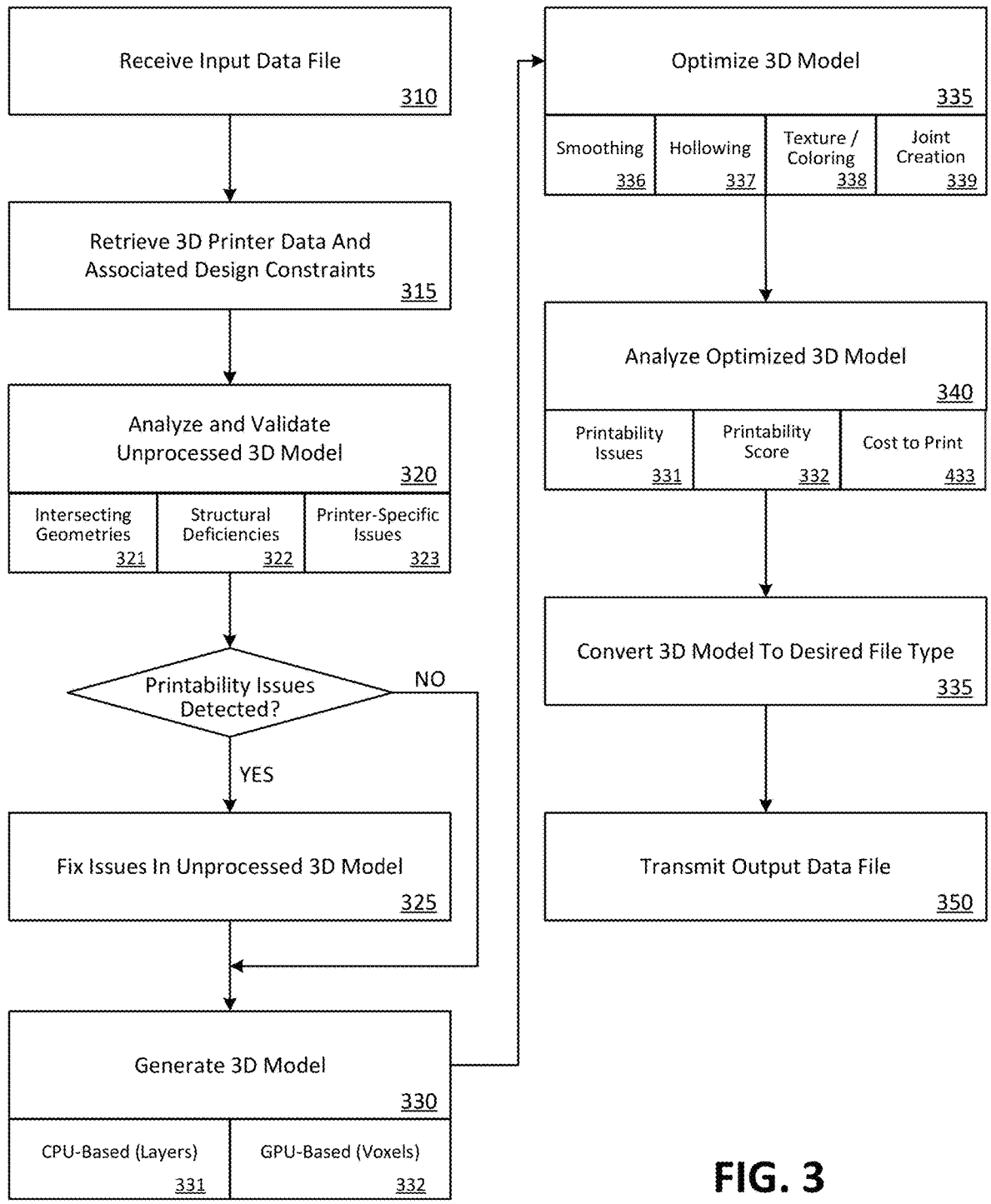
FIG. 3 is a flow chart describing an example method of validating and optimizing an unprocessed 3D model, in accordance with examples described herein.

FIG. 3 is a flow chart describing an example method of validating and optimizing an unprocessed 3D model, in accordance with examples described herein. In the below discussion of FIG. 3, reference may be made to features and examples shown and described with respect to FIGS. 1 and 2. For instance, the method illustrated in FIG. 3 can be performed by the exemplary 3D model systems 100 and 200 of FIGS. 1 and 2, respectively.

Referring to FIG. 3, the 3D model system receives an input data file (310). The input data file can describe an unprocessed 3D model desired to be 3D printed into an object by a user of the 3D model system. The input data file can be of one of a plurality of supported 3D file formats, including: .fbx, .obj, .dae, .stl, .3ds, .lwo, .lxo, .dxf, .x, .ifc, .ply, .cob, .ac, .ase, .dcom, .3mf, and .gcode. The input data file can be received over a network from the user device. The user, for example, can upload one or more input data files using a web-based upload user interface provisioned by the 3D model system. In addition, the input data file can be received via a third-party file hosting or sharing service. In some cases, the user can authenticate his or her user account with the file hosting or sharing service to enable the 3D model system to access input data files stored with the file hosting or sharing service.

The 3D model system can retrieve 3D printer data and design constraints associated with the particular model of 3D printer and/or 3D printing service (315). The 3D models system can prompt the user, via a selection on a user interface displayed on the user device, of a desired 3D printer model or a desired 3D printing service. In addition, the user may also be prompted for a selection of a desired 3D printing material to be used to print the finalized 3D model. Each 3D printer model, 3D printing service, and/or printing material may impose specific design constraints that affect the analysis and validation process performed by the 3D model system. For example, a first model of 3D printer or a first type of printing material may support a different minimum wall thickness as compared with a second model of 3D printer or a second type of printing material. As another example, the first printing material may have a different structural or weight support limit than the second printing material. In addition or as an alternative, the 3D model system can assume certain default inputs regarding the desired 3D printer model, 3D printing service, and/or printing material. In one implementation, the 3D model system, absent an overriding user input, can proceed with the validation and optimization process with a default setting of a specific third-party 3D printing service having a default set of design constraints on the 3D model design process.

Based on the 3D printing selection in step 315, the 3D model system can analyze and validate the unprocessed 3D model described by the input data file (320). This process can detect issues such as intersecting geometries present in the unprocessed 3D model (321), structural deficiencies (322), and any issues related to other design constraints imposed by the 3D printer, 3D printing service, and/or printing material selected the user (323). If any printability issues are detected by the 3D model system during the analysis at step 320, the 3D model system can attempt to automatically address the detected printability issues in the unprocessed 3D model (325).

At step 330, the 3D model system can generate a validated 3D model after the printability issues have been resolved in step 325. The generation of the validated 3D model can be hardware resource dependent and can include a CPU-based model generation (331) and a GPU-based model generation (332). The CPU-based model generation can be a layer-by-layer based process. The GPU-based model generation, on the other hand, can be a voxel-based process.

The 3D model can furthermore be optimized (335). This optimization process can include smoothing of the exterior surfaces of the 3D model (336), hollowing of portion of the 3D model having a filled interior volume (337), texture preservation and/or coloring of the external surfaces of the 3D model (338), and movable joint creation (339). During the hollowing process, for example appropriate locations to place escape holes for the printing material can be identified. The 3D model system can examine the orientation of the 3D model and find a location on a downward-facing surface of the 3D model having a sufficient size to hold an escape hole. In addition, the 3D model system can generate an inner surface within the portion of the 3D model to be hollowed. The 3D model system can identify regions that are further inward of the portion of the 3D model to be hollowed than the inner surface and remove these portions from the 3D model. This hollowing process can be controlled via a user input. For example, the 3D model system can receive a user input corresponding to an amount of hollowing to be performed. The user input can adjust the location of the inner surface within the portion of the 3D model to be hollowed. By adjusting the inner surface closer to the outer surface, more of the portion of the 3D model is hollowed. On the other hand, by adjusting the inner surface to be further away from the outer surface, less of the portion of the 3D model is hollowed.

After the optimization process, the optimized 3D model is again analyzed (340). The analysis performed in this step can include detection and correction of printability issues (e.g., introduced during the optimization process) (341), the determination of a printability score (342), and an estimation of a cost to 3D print the object depicted by the optimized 3D model (343).

At step 345, the 3D model is converted to a desired output data file format. The output data file format can be manually selected by the user or can be automatically selected by the 3D model system based on a user selection of the desired 3D printer model or a desired 3D printing service. For instance, certain 3D printer models only support certain data file formats as input. As another example, certain 3D printing services only support 3D models depicted by a specific data file format. Thus, based on the user selection of the desired 3D printer model and/or 3D printing service, the 3D model system can automatically select an appropriate output data file format. After the output data file is generated, it can be transmitted to the user device or to the desired 3D printing service (350).

Figure 4:
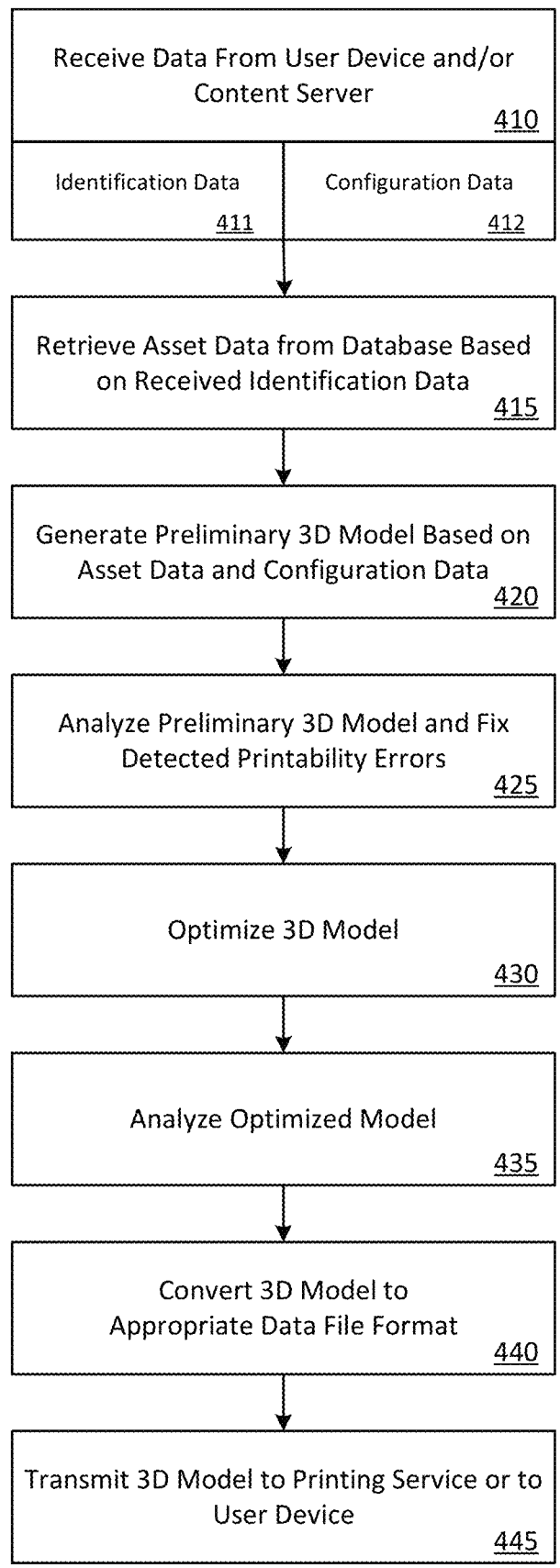
FIG. 4 is a flow chart describing an example method of generating and optimizing a 3D model based on data corresponding to 3D content captured in a dynamic virtual environment, in accordance with examples described herein.

FIG. 4 is a flow chart describing an example method of generating and optimizing a 3D model based on data corresponding to 3D content captured in a dynamic virtual environment, in accordance with examples described herein. In the below discussion of FIG. 4, reference may be made to features and examples shown and described with respect to FIG. 2. For instance, the method illustrated in FIG. 4 can be performed by the exemplary 3D model system 200 of FIG. 2.

Referring to FIG. 4, the 3D model system can receive data from a user device (e.g., user device 290 of FIG. 2) and/or a content server (e.g., content server 260 of FIG. 2) (410). The received data can include identification data (411) indicating an identity of the 3D content captured. In addition, the received data can include configuration data (412) indicating one or more dynamic characteristics of the 3D content as it is rendered in the dynamic virtual environment. The configuration data can be captured by a content capture plugin executing on the user device or on the content server. The data received at step 412 can further include security data (e.g., authentication information, authentication key, etc.) that authorizes the communication between the 3D model system, user device, and/or content server.

The 3D model system can retrieve appropriate asset data corresponding to the captured 3D content based on received identification information (415). Many sets of asset data can be pre-stored in a database accessible to the 3D model system. Each set of asset data stored in the database can correspond to one of a plurality of 3D content (e.g., a virtual avatar in an interactive video game) that can be captured for 3D printing. Based on information contained in the received identification data, the 3D model system can query the database for the appropriate set of asset data corresponding to the captured 3D content.

At step 420, the 3D model system can generate a preliminary 3D model based on the asset data and the configuration data. The 3D model system can generate, for example, a 3D model corresponding to a virtual avatar in a default pose and orientation based on the asset data. The 3D model system can apply the configuration data to the 3D model to configure the 3D model into a pose, orientation, or position that is indicated by the configuration data to generate the preliminary 3D model.

At step 425, the 3D model system can analyze the preliminary 3D model and fix any detected printability errors. The 3D model system can detect issues such as intersecting geometries present in the preliminary 3D model, structural deficiencies, and any issues related to other design constraints imposed by the 3D printer, 3D printing service, and/or printing material to be used in the 3D printing process. If any printability issues are detected by the 3D model system during the analysis, the 3D model system can attempt to automatically address the detected printability issues in the preliminary 3D model.

At step 430, the 3D model system can optimize the preliminary 3D model (430). During this step, the 3D model system can smooth the exterior surfaces of the 3D model, hollow portions of the preliminary 3D model having a filled interior volume, preserve texture and/or color of the external surfaces of the preliminary 3D model, and create movable joint creation.

After the preliminary 3D model is optimized by the 3D model system to generate an optimized 3D model, the 3D model system can analyze the optimized 3D model (435). The analysis performed can include detection and correction of printability issues (e.g., introduced during the optimization process), a determination of a printability score (342), and an estimation of a cost to 3D print the captured 3D content as represented by the optimized 3D model.

At step 440, the optimized 3D model is converted to a desired output data file format. The output data file format can be manually selected by the user or can be automatically selected by the 3D model system based on a user selection of the desired 3D printer model or a desired 3D printing service. For instance, certain 3D printer models only support certain data file formats as input. As another example, certain 3D printing services only support 3D models depicted by a specific data file format. Thus, based on the user selection of the desired 3D printer model and/or 3D printing service, the 3D model system can automatically select an appropriate output data file format. After the output data file is generated, it can be transmitted to the user device or to the desired 3D printing service (445).

Figure 5:
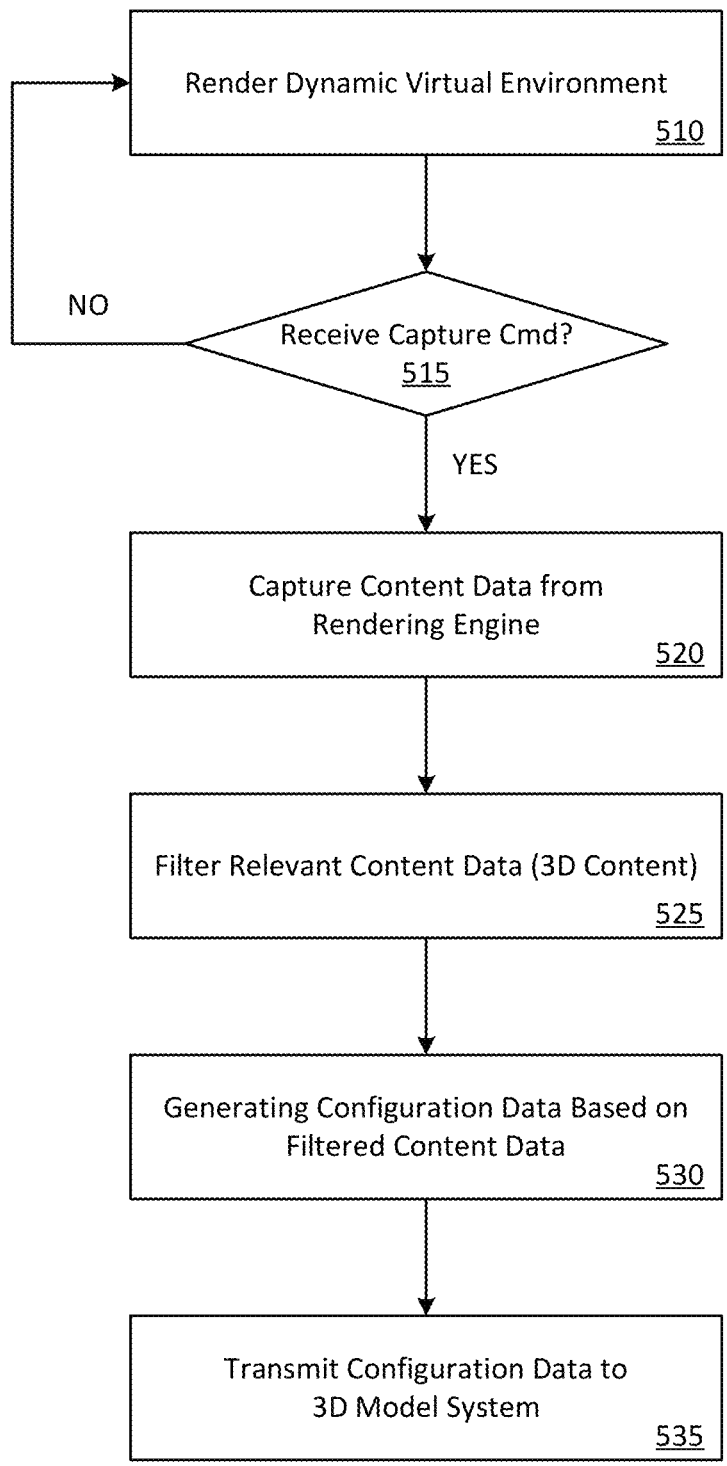
FIG. 5 is a flow chart describing an example method of capturing 3D content rendered in a dynamic virtual environment such that the captured 3D content can be generated into a 3D model and printed by a 3D printer, in accordance with examples described herein.

FIG. 5 is a flow chart describing an example method of capturing 3D content rendered in a dynamic virtual environment such that the captured 3D content can be generated into a 3D model and printed by a 3D printer, in accordance with examples described herein. In the below discussion of FIG. 5, reference may be made to features and examples shown and described with respect to FIG. 2. For instance, the method illustrated in FIG. 5 can be performed by the exemplary content capture plugins 265 or 295 of FIG. 2.

At step 510, a dynamic virtual environment is rendered by a user device or by a content server. The dynamic virtual environment can correspond to an interactive video game, a virtual reality environment, an augmented reality environment, etc. The user is able to control or manipulate the dynamic virtual environment via user input. For instance, the user is able to control, within the dynamic virtual environment, a virtual avatar.

At step 515, the content capture plugin executing on the user device or on the content server waits for a capture command to initiate capturing of the rendered 3D content. The capture command can be inputted by the user via a user interface overlayed on the displayed dynamic virtual environment, via shortcut, or via a hotkey. The capture command can also be programmatically and automatically generated by the user device based on one or more predetermined conditions. The one or more predetermined conditions can be tied to an accomplishment (e.g., reaching a milestone, etc.) in the dynamic virtual environment or a virtual location in the dynamic virtual environment. In the context of a video game, the one or more predetermined conditions can be the defeating of an adversary or reaching a certain game level. In this manner, 3D content rendered in the video game, such as the user's in-game character, can be automatically captured for 3D printing upon the user's defeating of the adversary or reaching the certain game level. If no capture command is received, the content capture plugin continues to wait for the capture command as the dynamic virtual environment is being rendered. If the capture command is received, the method proceeds to step 520.

At step 520, the content capture plugin captures content data from a rendering engine that renders the dynamic virtual environment. The content data can correspond to a portion or the entirety of the dynamic virtual environment displayed on the user device of the user. At step 525, the content capture plugin can filter the captured content data for data corresponding specifically to the desired 3D content to be captured. The 3D content being captured can correspond to a virtual avatar controlled by the user in the dynamic virtual environment. At step 530, the content capture plugin can generate configuration data based on the filtered content data. The generated configuration data can indicate changes to default characteristics of the 3D content caused by the dynamic rendering of the 3D content within the virtual environment. For example, the configuration data can indicate a dynamic posture and orientation of a virtual avatar or virtual objects carried by the virtual avatar in the virtual environment. At step 535, the generated configuration data is transmitted to the 3D model system such that a 3D model can be generated for the captured 3D content based, at least in part, on the configuration data.

According to embodiments, the process performed by the content capture plugin illustrated in FIG. 5 in generating configuration data corresponding to one or more dynamic characteristics of the captured 3D content can be performed without user interaction other than the user input to initiate the capturing process. For example, once the user input to initiate the capturing process is entered, the process can be performed automatically without requiring additional input, without requiring the user to exit from the dynamic virtual environment, and without requiring the rendering of the dynamic virtual environment to be paused.

User Interface Examples

Figure 6A:
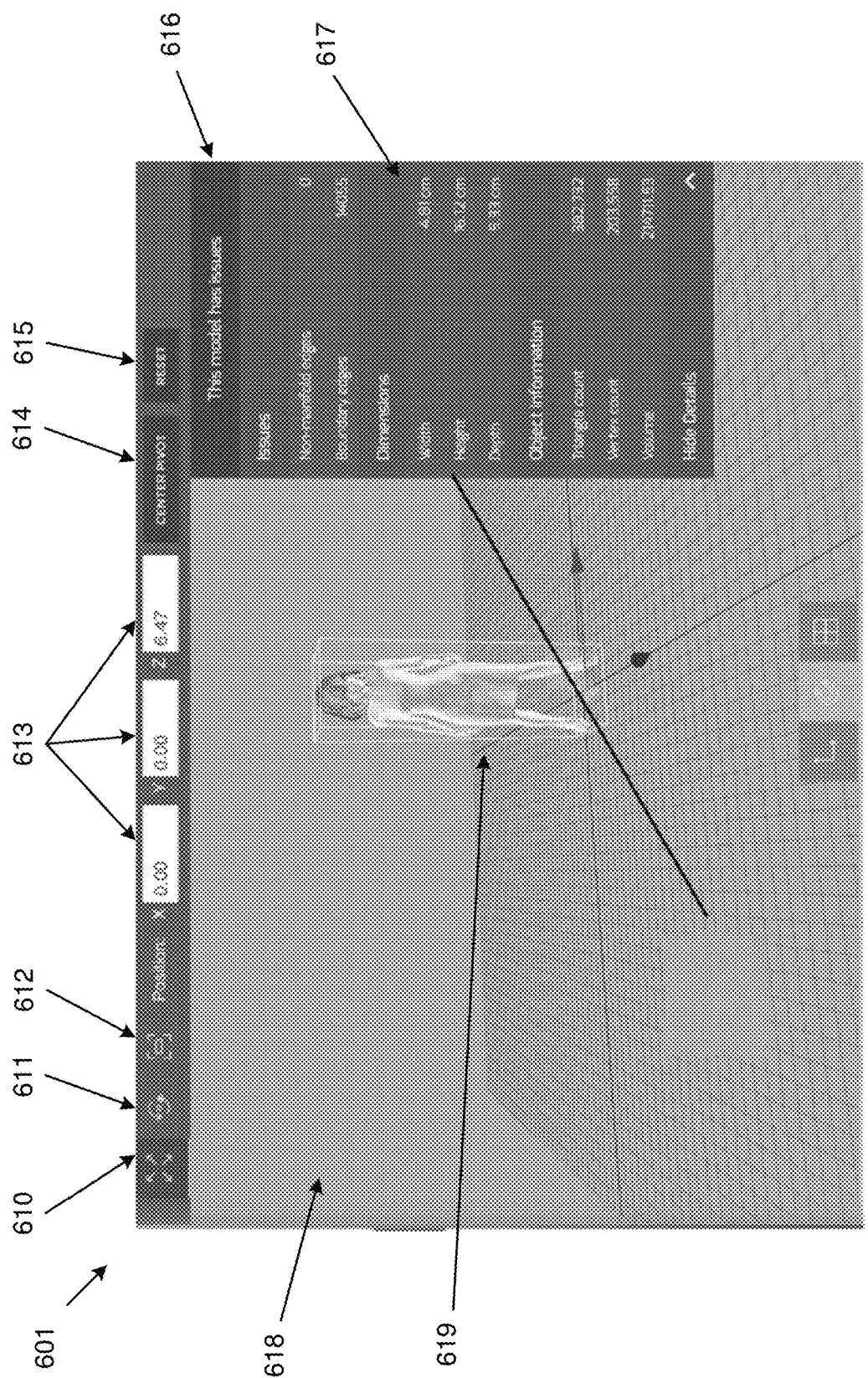
FIGS. 6A-6B are figures illustrating example user interfaces for controlling the operation of an example 3D model generation system, in accordance with examples described herein.
Figure 6B:
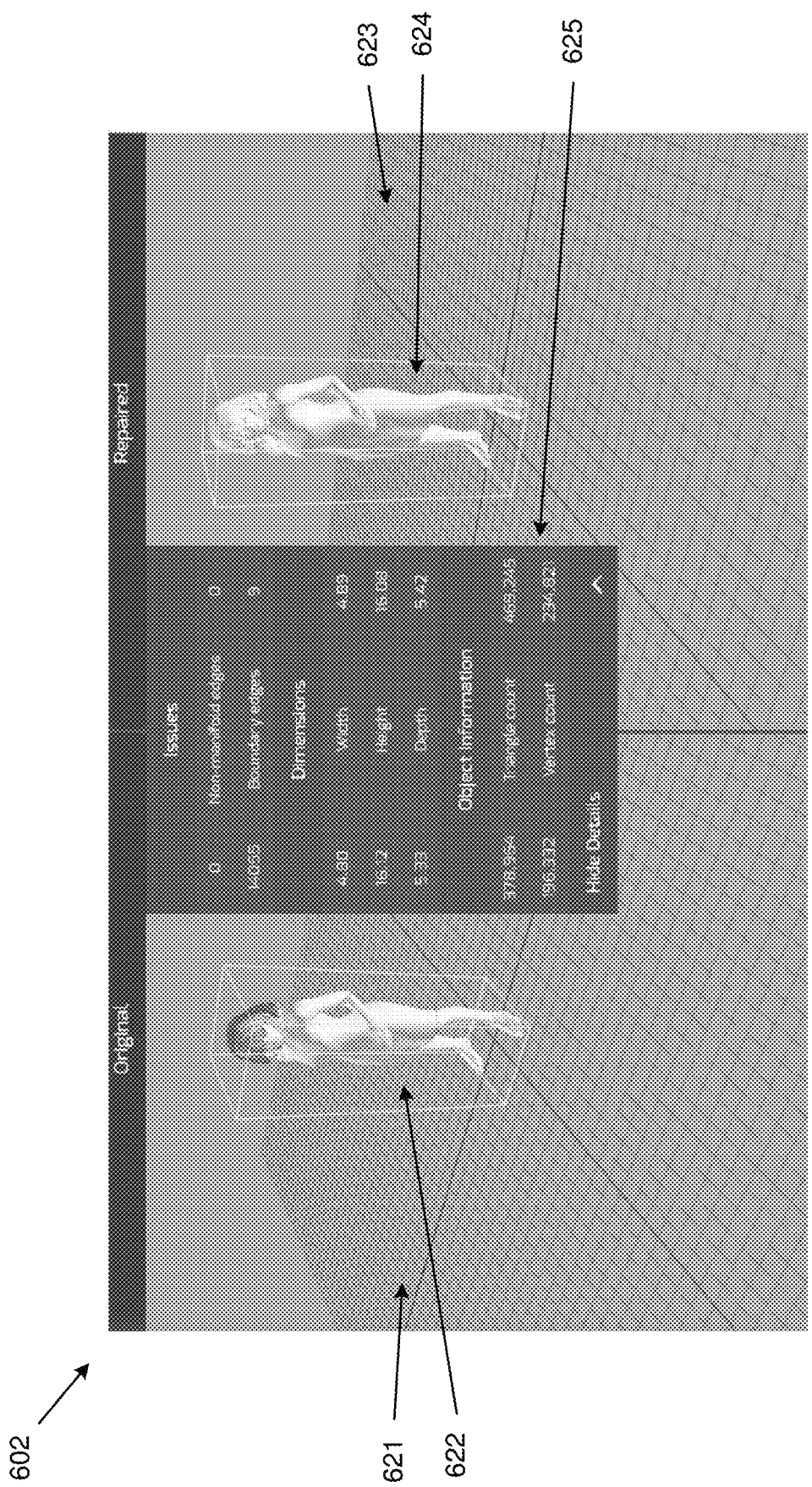

FIGS. 6A-6B are figures illustrating example user interfaces for controlling the operation of an example 3D model system, in accordance with examples described herein. In the below discussion of FIGS. 6A-6B, reference may be made to features and examples shown and described with respect to FIGS. 1 and 2. For instance, the user interfaces illustrated in FIGS. 6A-6B can be rendered by user devices 190 and 290 communicating with 3D model systems 100 and 200, respectively.

FIG. 6A illustrates an example user interface for viewing and manipulating an unprocessed 3D model on a user device of the user. The user interface 601 can be displayed on the user device within a web browser. The user interface 601 includes a display area 618 to display a rendering of the unprocessed 3D model 619. In the rendering of the unprocessed 3D model 619, portions of the unprocessed 3D model associated with detected printability issues are displayed in red while other portions of the unprocessed 3D model are displayed in yellow.

The user interface 601 can further include a set of user interface features 610, 611, 612 for manipulating the rendering of the unprocessed 3D model 619 displayed within display area 618. For example, move button 610 can be activated by the user to move or reposition the rendered unprocessed 3D model 619 within the display area 618. Rotate button 611 can be used to rotate the rendered unprocessed 3D model 619. Scale button 612 can be used to scale (e.g., adjust a zoom or magnification) the rendered unprocessed 3D model 619. In addition, coordinate entry 613 can be used by the user to enter positional coordinates to move the rendered unprocessed 3D model 619. Center pivot button 614 and reset button 615 can be used to center the rendered unprocessed 3D model 619 within the display area 618 and to reset the adjustments made to manipulate the rendered unprocessed 3D model 619, respectively.

The user interface 601 further includes user interface features 616 to display information regarding the unprocessed 3D model that is displayed within the display area 618. For example, an informational banner 616 can be displayed to inform the user whether the unprocessed 3D model has printability issues. In addition, informational panel 617 displays a variety of information regarding the unprocessed 3D model including, for example, details regarding the printability issues, dimensions of the unprocessed 3D model, and a vertex and triangle count of the unprocessed 3D model.

FIG. 6B illustrates an example user interface for viewing an unprocessed 3D model alongside a corresponding validated and/or optimized 3D model. The user interface 602 can also be displayed within a web browser executing on the user device.

User interface 602 can include a first display area 621 for display a rendering of an unprocessed 3D model 622. The user interface 602 can further include a second display area 623 for displaying a rendering of a validated and/or optimized 3D model 624. In both display areas 621 and 623, the rendered 3D models being displayed can be displayed in a manner such that portions of the 3D models associated with printability issues can be displayed in color that is different from portions of the 3D models that are free from printability issues.

User interface 602 further includes a side-by-side information panel 625 that displays, in a side-by-side manner, information corresponding to the unprocessed 3D model and information corresponding to the validated and/or optimized 3D model. The information panel can display information such as details regarding printability issues of the two 3D models, dimensions of the two 3D models, and a vertex and triangle count of the two 3D models. By displaying information regarding the 3D models in a side-by-side fashion, the user can easily compare the characteristics of validated and/or optimized 3D model as compared with the unprocessed 3D model.

User interface 602 can further include user interface features (not shown in FIG. 6B) to manipulate the renderings of the 3D models displayed in display areas 621 and 623. For instance, the user interface 602 can include a move button to move the rendered 3D models within the display areas 621 and 623, a rotate button to rotate the rendered 3D models, and a scale button to scale the rendered 3D models. The user interface features to manipulate the renderings of the 3D models can operate in a manner such that the rendering of the unprocessed 3D model 622 displayed in display area 621 is manipulated synchronously with the rendering of the validated and/or optimized 3D model displayed in display area 623. In other words, the rotate button can be activated to rotate the renderings of the 3D models displayed in display areas 621 and 622 in the same direction and at the same rate of rotation.

Hardware Diagrams

Figure 7:
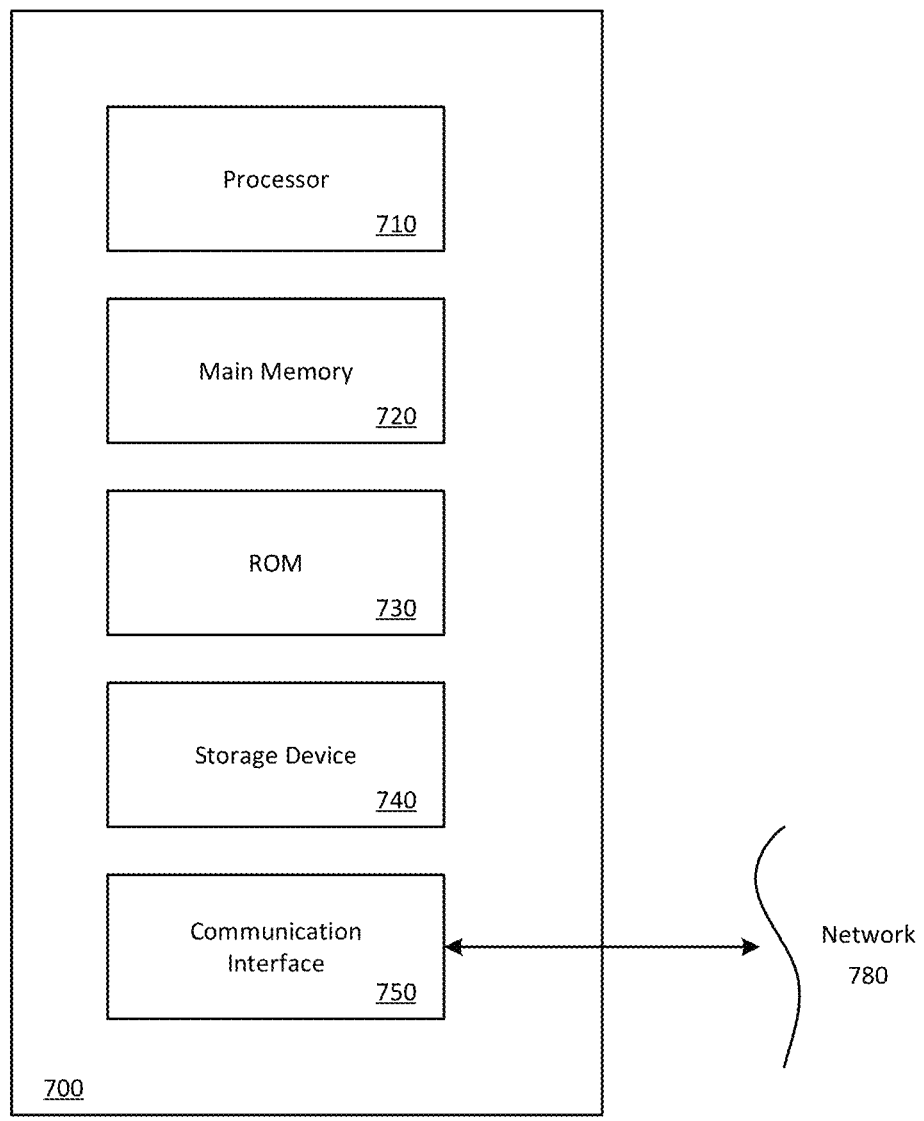
FIG. 7 is a block diagram illustrating a computer system upon which examples described herein may be implemented.

FIG. 7 is a block diagram illustrating a computer system upon which examples described herein may be implemented. In the context of FIGS. 1 and 2, the 3D model systems 100 and 200 may be implemented using a computer system 700 such as described by FIG. 7. The 3D model systems 100 and 200 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices and one or more servers Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A method for validating and optimizing a 3D model for 3D printing, the method being implemented by a computer system and comprising:
   receiving, over a network, a first set of data corresponding to an unprocessed 3D model to be 3D printed;
   identifying 3D printing design constraints based on a 3D printer model, a 3D printing service, or desired 3D printing materials;
   analyzing, based on the 3D printing design constraints, the first set of data to identify a set of printability issues of the unprocessed 3D model;
   generating a validated 3D model by remedying one or more of the set of printability issues of the unprocessed 3D model;
   wherein the validated 3D model comprises a plurality of voxels arranged in a three-dimensional array and each of the plurality of voxels having a finite volume; and
   optimizing the validated 3D model for 3D printing by performing operations including:
      identifying a first set of voxels of the plurality of voxels as exterior voxels, the first set of voxels being identified based on their respective positions along an exterior surface of the validated 3D model;
      for a first exterior voxel of the first set of voxels, determining an exterior surface orientation of the first exterior voxel;
      performing, based on the determined exterior surface orientation of the first exterior voxel, a smoothing operation on an exterior surface of the first exterior voxel, including performing a triangulation operation using the determined exterior surface orientation of the first exterior voxel; and
      in response to a determination that a dimension for a group of voxels is below a threshold limit, adding voxels to the group of voxels such that the threshold limit for the dimension is met.

2. The method of claim 1, further comprising:
   transmitting, to a user device, a second set of data to cause the user device to display a rendering of the unprocessed 3D model on a display of the user device; and
   wherein regions of the unprocessed 3D model not associated with the set of printability issues are displayed in a default color and regions of the unprocessed 3D model associated with the set of printability issues are displayed in a color other than the default color.

3. The method of claim 2, further comprising:
   transmitting, to a user device, a third set of data to cause the user device to display a rendering of the validated 3D model on the display of the user device; and
   wherein the rendering of the unprocessed 3D model and the rendering of the validated 3D model are displayed contemporaneously.

4. The method of claim 3, wherein converting the optimized and validated 3D model to an output 3D file format includes programmatically selecting the output 3D file format based on a user input of a 3D printer model or a 3D printing service.

5. A network system for validating and optimizing a 3D model for 3D printing, comprising:
   one or more processors;
   one or more memory resources storing instructions that, when executed by the one or more processors, cause the network system to:
      receive, over a network, a first set of data corresponding to an unprocessed 3D model to be 3D printed;

identify 3D printing design constraints based on a 3D printer model, a 3D printing service, or desired 3D printing materials;

analyze, based on the 3D printing design constraints, the first set of data to identify a set of printability issues of the unprocessed 3D model;

generate a validated 3D model by remedying one or more of the set of printability issues of the unprocessed 3D model;

wherein the validated 3D model comprises a plurality of voxels arranged in a three-dimensional array and each of the plurality of voxels having a finite volume; and optimize the validated 3D model for 3D printing by performing operations including:

identifying a first set of voxels of the plurality of voxels as exterior voxels, the first set of voxels being identified based on their respective positions along an exterior surface of the validated 3D model;

for a first exterior voxel of the first set of voxels, determining an exterior surface orientation of the first exterior voxel;

performing, based on the determined exterior surface orientation of the first exterior voxel, a smoothing operation on an exterior surface of the first exterior voxel, including performing a triangulation operation using the determined exterior surface orientation of the first exterior voxel; and in response to a determination that a dimension for a group of voxels is below a threshold limit, adding voxels to the group of voxels such that the threshold limit for the dimension is met.

6. The network system of claim 5, wherein the executed instructions further cause the network system to:

transmit, to a user device, a second set of data to cause the user device to display a rendering of the unprocessed 3D model on a display of the user device; and wherein regions of the unprocessed 3D model not associated with the set of printability issues are displayed in a default color and regions of the unprocessed 3D model associated with the set of printability issues are displayed in a color other than the default color.

7. The network system of claim 6, wherein the executed instructions further cause the network system to:

transmit, to a user device, a third set of data to cause the user device to display a rendering of the validated 3D model on the display of the user device; and wherein the rendering of the unprocessed 3D model and the rendering of the validated 3D model are displayed contemporaneously.

8. The network system of claim 5, wherein the executed instructions further cause the network system to:

convert the optimized and validated 3D model to an output 3D file format; and wherein converting the optimized and validated 3D model to an output 3D file format includes programmatically selecting the output 3D file format based on a user input of a 3D printer model or a 3D printing service.

9. A non-transitory computer readable medium storing instructions that, when executed by one or more processors of a network system, cause the network system to:

receive, over a network, a first set of data corresponding to an unprocessed 3D model to be 3D printed;

identify 3D printing design constraints based on a 3D printer model, a 3D printing service, or desired 3D printing materials;

analyze, based on the 3D printing design constraints, the first set of data to identify a set of printability issues of the unprocessed 3D model;

generate a validated 3D model by remedying one or more of the set of printability issues of the unprocessed 3D model;

wherein the validated 3D model comprises a plurality of voxels arranged in a three-dimensional array and each of the plurality of voxels having a finite volume; and optimize the validated 3D model for 3D printing by performing operations including:

identifying a first set of voxels of the plurality of voxels as exterior voxels, the first set of voxels being identified based on their respective positions along an exterior surface of the validated 3D model;

for a first exterior voxel of the first set of voxels, determining an exterior surface orientation of the first exterior voxel;

performing, based on the determined exterior surface orientation of the first exterior voxel, a smoothing operation on an exterior surface of the first exterior voxel, including performing a triangulation operation using the determined exterior surface orientation of the first exterior voxel; and in response to a determination that a dimension for a group of voxels is below a threshold limit, adding voxels to the group of voxels such that the threshold limit for the dimension is met.

10. The method of claim 1, wherein determining the exterior surface orientation of the first exterior voxel is based on neighbor voxels to the first exterior voxel.

11. The method of claim 1, wherein determining the exterior surface orientation of the first exterior voxel comprises performing a lookup from a stored database of valid exterior surface orientations.

12. The method of claim 11, wherein the lookup is performed based on the orientation of the first exterior voxel and orientations of neighbor voxels to the first exterior voxel.

13. The method of claim 1, further comprising converting the optimized and validated 3D model to an output 3D file format.

14. The network system of claim 5, wherein determining the exterior surface orientation of the first exterior voxel is based on neighbor voxels to the first exterior voxel.

15. The network system of claim 5, wherein determining the exterior surface orientation of the first exterior voxel comprises performing a lookup from a stored database of valid exterior surface orientations.

16. The network system of claim 15, wherein the lookup is performed based on the orientation of the first exterior voxel and orientations of neighbor voxels to the first exterior voxel.

* * * * *